(12) United States Patent
Gore et al.

(10) Patent No.: US 8,622,660 B1
(45) Date of Patent: Jan. 7, 2014

(54) DEER FEEDER FILLING APPARATUS

(76) Inventors: Michael K. Gore, Pipe Creek, TX (US);
Kathleen A. Gore, Pipe Creek, TX (US)

(*) Notice: Subject to any disclaimer, the term of this patent is extended or adjusted under 35 U.S.C. 154(b) by 498 days.

(21) Appl. No.: 13/038,022

(22) Filed: Mar. 1, 2011

Related U.S. Application Data

(60) Provisional application No. 61/309,075, filed on Mar. 1, 2010.

(51) Int. Cl.
*B60P 1/60* (2006.01)

(52) U.S. Cl.
USPC ............. 406/41; 406/144; 406/145; 406/196

(58) Field of Classification Search
USPC .................................. 406/41, 144, 145, 196
See application file for complete search history.

(56) References Cited

U.S. PATENT DOCUMENTS

| | | | |
|---|---|---|---|
| 1,844,065 A | 2/1932 | Heintz et al. | |
| 2,665,949 A * | 1/1954 | Ericson | 406/137 |
| 2,970,532 A | 2/1961 | Skelton | |
| 3,726,441 A * | 4/1973 | Keyes et al. | 222/626 |
| 4,291,665 A * | 9/1981 | Bash et al. | 124/56 |
| D282,367 S | 1/1986 | Satake | |
| 4,583,883 A | 4/1986 | Johanning | |
| 4,846,608 A | 7/1989 | Sanders | |
| 5,156,102 A * | 10/1992 | Andersen | 111/175 |
| 5,209,608 A | 5/1993 | Edwards | |
| 5,618,136 A * | 4/1997 | Smoot | 406/93 |
| 5,862,777 A | 1/1999 | Sweeney | |
| 6,425,714 B1 * | 7/2002 | Waddell | 406/81 |
| 6,557,598 B2 | 5/2003 | Glover et al. | |
| 6,564,746 B2 | 5/2003 | Burnham | |
| 6,892,909 B1 * | 5/2005 | Hebert et al. | 222/637 |
| D507,079 S | 7/2005 | Drum | |
| 2008/0282650 A1 * | 11/2008 | Federas | 53/562 |
| 2009/0202311 A1 * | 8/2009 | Deal et al. | 406/41 |

* cited by examiner

*Primary Examiner* — Joseph Dillon, Jr.
(74) *Attorney, Agent, or Firm* — Montgomery Patent & Design; Robert C. Montgomery

(57) ABSTRACT

An automated filling apparatus which propels various deer feed into an elevated deer feeder comprises a cart having a mounted container which is towed by a vehicle to a feeder location. A base of the cart receives an air duct connected to an air blower which supplies an air flow. The apparatus introduces a flow of deer feed into the air flow which is in turn conveyed upwardly into the elevated deer feeder via a second opposing air duct being connected to an elongated flexible hose having an elbow portion at its upper end and retained upon an upper lip of the deer feeder. After activating the blower, a quantity of deer feed is poured into the container and is propelled upward through the tubing and dispensed into the container portion of the deer feeder.

18 Claims, 3 Drawing Sheets

DEER FEEDER FILLING APPARATUS

RELATED APPLICATIONS

The present invention was first described in and claims the benefit of U.S. Provisional Application No. 61/309,075 filed Mar. 1, 2010, the entire disclosures of which are incorporated herein by reference.

FIELD OF THE INVENTION

The present invention relates generally to deer feeders, and in particular, to an apparatus including an air pump for filling a deer feeder with feed.

BACKGROUND OF THE INVENTION

Many people enjoy the presence of deer and other wild game in their yards and on their property. In order to attract such animals, many place elevated feeding stations filled with corn, grains or other feed which entice the animals to stay, feed and hopefully return on a daily basis.

While most of these feeders work, a primary inconvenience of all such apparatuses is that they need to be refilled on a regular basis. This refilling operation is most often done by climbing a ladder and pouring feed into a top portion of the feeder. However, this is not both time consuming and somewhat dangerous due to the elevated nature of the feeder.

Another method available for refilling most deer feeders is to take the feeder down, refill it and then place it back. This is method is even more time consuming and requires significant physical exertion.

Various attempts have been made to provide wildlife feeder systems. Examples of these attempts can be seen by reference to several U.S. patents, such as U.S. Pat. No. 5,862,777; U.S. Pat. No. 6,557,598; and U.S. Pat. No. 6,564,746. However, none of these designs are similar to the present invention.

While these apparatuses fulfill their respective, particular objectives, each of these references suffer from one (1) or more of the aforementioned disadvantages. Many such apparatuses require significant time and physical exertion to refill. Also, many such apparatuses require additional complex portions to install and maintain. Furthermore, many such apparatuses are aesthetically unpleasing. In addition, many such apparatuses may inhibit the efficacy of an associated feeder. Accordingly, there exists a need for a filling device for deer feeders without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a device to assist in regular refilling of a deer feeder which reduces the time and effort associated with that task. Thus, the object of the present invention is to solve the aforementioned disadvantages and provide for this need.

To achieve the above objectives, it is an object of the present invention to assist in filling an elevated deer feeder while the operator remains at a ground level, eliminating the need to utilize a ladder or other method for reaching the feeder. The apparatus includes a mobile cart, a blower, and a container for retaining an amount of deer feed.

Another object of the present invention is to enable portable use of the apparatus by comprising the mobile cart of a wheelbarrow-style structure including a pair of wheels. The mobile cart supports the container and further provides space to contain and transport additional portions of the apparatus including a volume of feed, the blower, and a plurality of flexible hoses.

Yet still another object of the present invention is to provide a hitch receiver to facilitate attachment to a hitch portion of a vehicle, allowing the apparatus to be towed to a desired location.

Yet still another object of the present invention is to utilize a first flexible hose to connect the container to the elevated deer feeder. An end of the first flexible hose includes a rigid goose-neck fitting which helps the user to reach the top of the deer feeder and hang the hose over the edge of the feeder. The opposing end includes a quick-connect coupling which attaches to a lower portion of the container.

Yet still another object of the present invention is to provide automated delivery of feed from the container through the first hose and into the deer feeder. A second flexible hose is used to attach the blower. The user can then place a volume of feed in the container and actuate the blower. The blower delivers a flow of air which then passes through the container, receives the feed via gravity, and carries feed up the first hose and into the deer feeder.

Yet still another object of the present invention is to provide a lid for the container to prevent unwanted discharge of feed through the top of the container while the blower is active.

Yet still another object of the present invention is to provide a method of utilizing the device that provides a unique means of procuring the apparatus, storing the blower, the first flexible hose, and the second flexible hose in the container or cart, loading a quantity of deer feed into the cart, transporting the apparatus to an existing deer feeder structure, unloading and positioning the blower on a ground surface adjacent to the cart, connecting the first flexible hose to container and the blower, connecting the second flexible hose to the container, positioning the goose-neck fitting over a top edge of the deer feeder structure, starting the blower, pouring the deer feed into the container, allowing a period of time for the load of deer feed to be conveyed into the deer feeder structure, and benefiting from reduced effort and improved safety while filling deer feeding structures.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
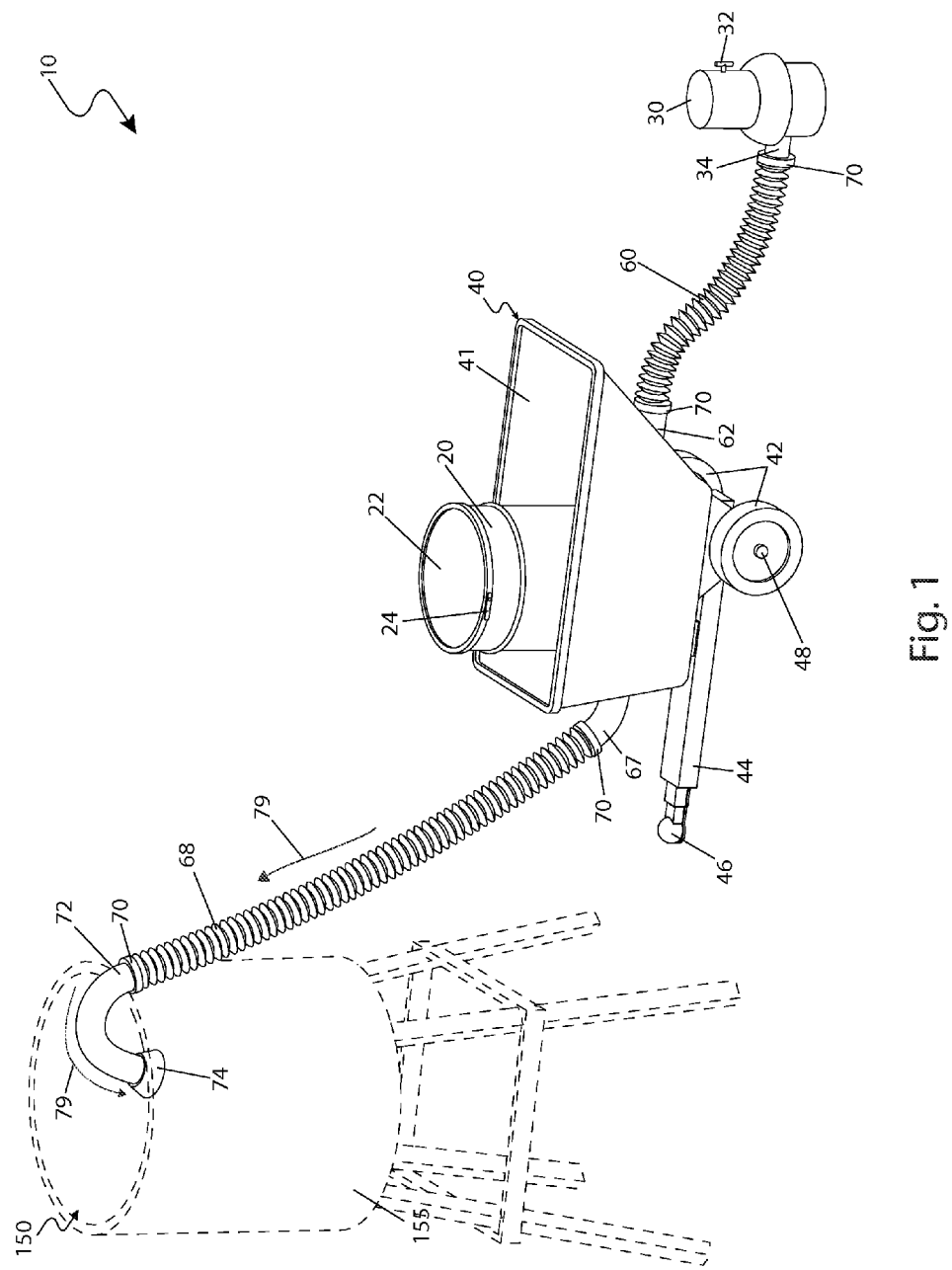
FIG. 1 is an environmental view of a deer feeder filling apparatus 10, according to a preferred embodiment of the present invention.

DESCRIPTIVE KEY 10 feeder filling apparatus
20 container 22 lid/ring assembly
24 latch
30 blower
32 recoil
34 blower outlet
40 cart
41 cart body
42 wheel
44 tongue
46 hitch receiver
47 cart floor
48 axle
49 spacer
50 first aperture
52 second aperture
54 third aperture
56 fourth aperture
60 first flexible hose
62 first pipe
64 sanitary tee fitting
66 second pipe
67 elbow
68 second flexible hose
70 quick-disconnect coupling
72 goose-neck fitting
74 exit funnel
75 air flow
79 air-and-feed flow
80 container funnel
100 deer feed
150 deer feeder
155 deer feed container
200 fastener

DETAILED DESCRIPTION OF THE PREFERRED EMBODIMENT

Figure 2:
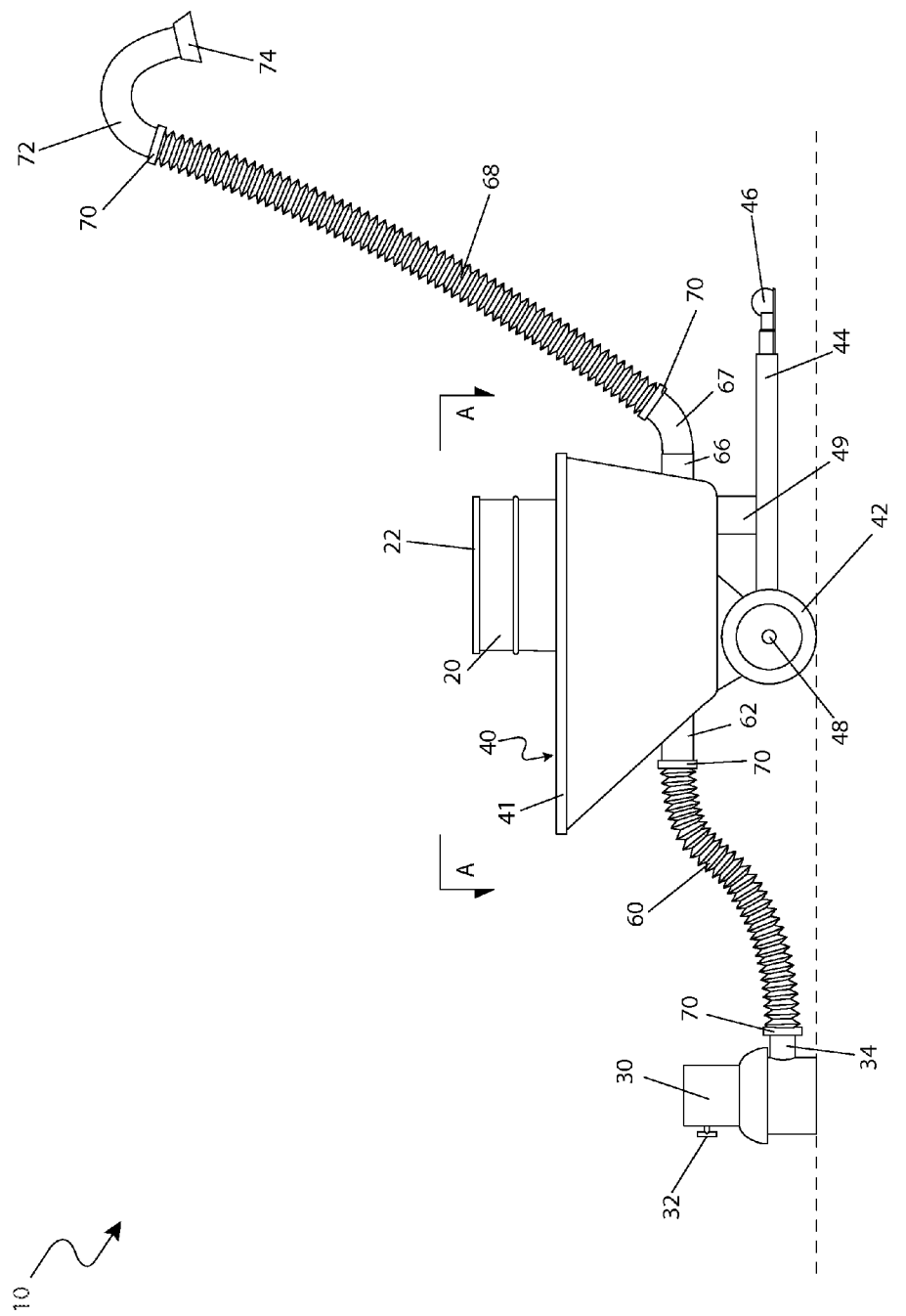
FIG. 2 is a side view of the deer feeder filling apparatus 10, according to a preferred embodiment of the present invention; and, FIG. 3 is a cut-away side view of the deer feeder filling apparatus 10, according to a preferred embodiment of the present invention.
Figure 3:
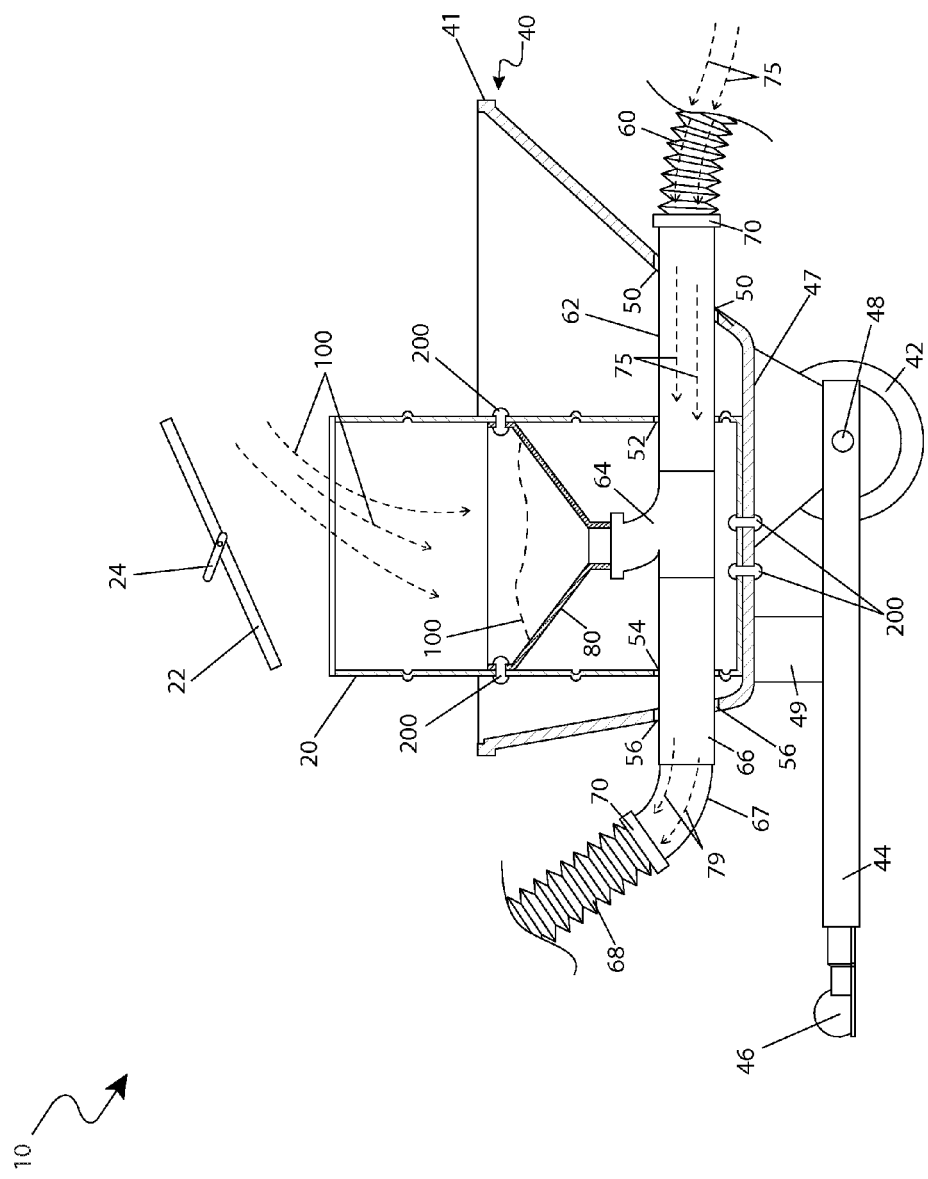

The best mode for carrying out the invention is presented in terms of its preferred embodiment, herein depicted within FIGS. 1 through 3. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a deer feeder filling apparatus (herein described as the "apparatus") 10, which provides a means for filling an elevated deer feeder 150 while an operator remains at a ground level, thereby eliminating climbing a ladder with heavy deer feed containers 155 in order to manually fill said deer feeder 150.

Referring now to FIG. 1, an environmental view of the apparatus 10, according to the preferred embodiment of the present invention, is disclosed. The apparatus 10 comprises a cylindrical container 20 designed to retain an amount of deer feed 100 to be conveyed into a deer feed container portion 155 of an exiting deer feeder structure 150. The apparatus 10 further comprises a blower 30 and a mobile cart 40. The container 20 occupies the cart 40 and is affixed to the blower 30 via an assembly of PVC piping and a first flexible hose 60. Once loaded into the container 20, the deer feed 100 enters the PVC piping and is propelled by an air flow 75 from the blower 30, thereby establishing an air-and-feed flow 79 which subsequently passes through a second flexible hose 68 being approximately ten (10) feet in length enabling conveyance of said air-and-feed flow 79 into the elevated deer feeder container 155. The flexible hoses 60, 68 are approximately three (3) inches in diameter and are connected using a plurality of quick-disconnect couplings 70 for easy assembly and disassembly of the apparatus 10.

The cart 40 preferably comprises a conventional polymer ATV garden trailer unit similar to those sold by SEARS® and other retailers, further comprising standard features such as, but not limited to a rugged open-top tapered plastic cart body 41, a pair of pneumatic or solid rubber wheels 42, a metal channel-shaped tongue 44 having an integral ball-hitch receiver 46, a load-bearing transverse axle 48, and a spacer 49. The wheels 42 provide the apparatus 10 with the ability to be moved easily and effectively to a site of a deer feeder structure 150. The hitch receiver 46 is envisioned to facilitate a one-and-seven-eighths (1⅞) inch ball or equivalent hitching device enabling the apparatus 10 to be towed by an all-terrain vehicle (ATV), a pickup truck, or other vehicle.

The proximal end portion of the second flexible hose 68 is connected to the aforementioned PVC piping within the cart 40 by a quick-disconnect coupling 70. The distal end portion of said first flexible hose 60 also comprises a quick-disconnect coupling 70 which provides an attachment means to a plastic-molded goose-neck fitting 72 having an integral exit funnel 74. Said goose-neck fitting 72 is designed to wrap around an upper edge of the deer feed container 155 in a stable manner, thereby providing a "hands-free" method to direct the deer feed 100 into said container 155 during use. The goose-neck fitting 72 is envisioned to comprise a commercially-available component designed to blow leaves out of gutters and sold by companies such as SEARS®, WEED EATER®, and others. The PVC piping components, the flexible hoses 60, 68, and the goose-neck fitting 72 are mechanically connected to each other using quick-connect couplings 70, thereby providing easy disassembly of the apparatus 10. Said quick-disconnect couplings 70 are envisioned to comprise quarter-turn bayonet-type devices providing an insert-and-twist joining method. The flexible hoses 60, 68 and the quick-disconnect couplings 70 are envisioned to be similar to commercially-available components used for conveyance and disposal of sewage materials from recreational vehicles, being made of durable plastic materials and manufactured by companies such as VALTERRA®. The blower 12 comprises a conventional four-cycle gasoline-powered backpack-type leaf blower capable of enough thrust to propel the deer feed 100 and is similar to units made by companies such as TROY-BUILT® and others. The blower 30 delivers an air flow 75 through a blower outlet 34, connected to the first flexible hose 60 via a quick-disconnect coupling 70. Furthermore, said blower 30 is envisioned to comprise a pull-start recoil device 32 for easy starting.

Referring now to FIGS. 2 and 3, side and cut-away views of the apparatus 10, according to the preferred embodiment of the present invention, are disclosed. The container 20 comprises a standard metal or plastic drum envisioned to have a standard volume such as, but not limited to: thirty (30), thirty-two (32), forty (40), or fifty-five (55) gallons. Said container 20 is affixed to a floor portion 47 of the cart 40 via a plurality of common fasteners 200 such as rivets, bolts, screws, or the like, thereby stabilizing said container during transport and use of the apparatus 10. The upper portion of the container 20 is closed by means of a standard drum lid/ring assembly 22 being secured to the container 20 in a conventional manner via an integral pivoting latch of bolt-type latch mechanism 24.

The previously described first flexible hose 60 conveys an air flow 75 produced by the blower 30 through an assembly of rigid PVC piping which passes through a first aperture portion 50 cut through a rear surface of the cart 40, subsequently through the container 20 via second 52 and third 54 apertures, and finally exits the cart 40 via a fourth aperture 56 being located along a front surface of said cart 40. A gravity fed flow of deer feed 100 from within the container 20 is introduced into the air flow 75, thereby producing an air-and-feed flow 79 which then passes through the aforementioned second flexible hose 68 and into the deer feed container 155 (see FIG. 1). Said rigid PVC piping assembly comprises a series of plumbing components being cemented together to form a unitary linear assembly comprising a first pipe 62 routed through the first 52 and second 54 apertures, a sanitary tee fitting 64 residing within said container 20, a second pipe 66 routed through the third 54 and fourth 56 apertures, and an upwardly turned forty-five degree (45°) elbow fitting 67. Said PVC assembly further comprises a quick-disconnect coupling 70 at either end portion for quick connection to the flexible hoses 60, 68. Although the PVC assembly is depicted here being made up of individual standard fittings, it is understood that said PVC assembly may be mass-produced as a single molded part without deviating from the concept, and as such should not be interpreted as a limiting factor of the apparatus 10.

The sanitary tee fitting 64 acts as an air-and-feed mixing chamber being positioned at an intermediate location within the container 20 and having an upwardly directed arcuate port which provides a standard plumbing attachment means to a superjacent container funnel 80. Said container funnel 80 is mounted horizontally at an intermediate height within the container 20, thereby providing a means to contain and direct said deer feed 100 into the sanitary tee fitting 64. The container funnel 80 comprises a shallow round plastic unit having an outside diameter which fits snuggly within the container 20. Said container funnel 80 further comprises a central tapering bottom surface, and a center orifice which is inserted into and cemented to the sanitary tee fitting 64. The container funnel 80 is envisioned to be a commercially-available unit similar to those made by ON TIME FEEDERS, INC. and the ACADEMY CO. An upper perimeter edge of the container funnel 80 is securely affixed to wall portions of the container 20 via a plurality of equally-spaced fasteners 200 such as rivets, screws, or the like.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be assembled and utilized as indicated in FIG. 1.

The method of assembling the apparatus 10 may be achieved by performing the following steps: procuring the apparatus 10; attaching the hitch receiver portion 46 of the cart 40 to an appropriately equipped towing vehicle such as an ATV, pick-up truck, or the like in a conventional manner; storing the blower 30, the first flexible hose 60, the second flexible hose 68, and the goose-neck fitting 72 into the container 20 during transportation; placing and securing the lid/ring assembly 22 onto the container 20; loading a quantity of deer feed 100 into the cart 40 and/or other transporting means; transporting the apparatus 10 to a desired location of an existing deer feeder structure 150; removing the lid/ring assembly 22 from the container 20 to reveal the contained portions of the apparatus 10; unloading and positioning the blower 30 upon a ground surface being adjacent to the cart 40; connecting the first flexible hose 60 to the first pipe 62 and the blower outlet 34 using the quick-disconnect couplings 70; connecting the second flexible hose 68 to the elbow fitting 67 and the goose-neck fitting 72 using the quick-disconnect couplings 70; and, positioning the exit funnel portion 74 of the goose-neck fitting 72 over a top edge of said deer feeder structure 150.

The method of utilizing the apparatus 10 may be achieved by performing the following steps: starting the blower 30 using the recoil 32 in a normal manner; pouring the deer feed 100 into the container 20; replacing and securing the lid/ring assembly 22 onto the container 20 to avoid deer feed 100 being discharged out of a top opening of said container 20; allowing a period of time for the load of deer feed 100 to be conveyed into the deer feed container portion 155 of the deer feeder structure 150; loading additional deer feed 100 into said container 20 as previously described, until obtaining a desired volume of deer feed 100 within the deer feeder structure 150; turning off the blower 30; disassembling the goose-neck fitting 72, the first flexible hose 60, and the second flexible hose 68; loading said goose-neck fitting 72, first flexible hose 60, and second flexible hose 68 along with the blower 30, into the container 20; replacing and securing the lid/ring assembly 22 onto the container 20; proceeding to and filling additional deer feeder structures 150 as previously described; and, benefiting from reduced effort and improved safety while filling deer feeding structures 150 using the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A deer feeder filling apparatus, comprising: a transportation cart; a feed container affixed to said transportation cart, further comprising a funnel; a blower; and, a feed transfer assembly, comprising a first portion removably attached to and in fluid communication with a blower outlet, an intermediate portion removably attached to and in fluid communication with said funnel of said feed container, and a second portion comprising a dispensing pipe; wherein a desired amount of feed is dispensed into said funnel of said feed container; wherein said blower is electrically connected to an external power source; wherein said blower produces an amount of compressed air, which travels through said feed transfer assembly and draws in said feed through said funnel within said feed container, and dispenses said feed through said dispensing flange; and, wherein said apparatus is suited for transferring deer feed into an elevated feeder; wherein said feed container further comprises:
- a cylindrical container body;
- a lid removably secured about an upper perimeter edge thereof;
- a plurality of fasteners affixing a bottom of said container body to a floor of said transportation cart; and,
- a pair of apertures along opposing locations of a side wall thereof, adjacent to said container bottom, and aligned with a pair of apertures of said transportation cart;
- wherein said feed transfer assembly is routed through said pair of apertures of said transportation cart and said pair of apertures of said container body, such that said intermediate portion is retained therein said container body; and,
- wherein said container body pair of apertures and said transportation cart apertures are aligned along a horizontal centerline.

2. The apparatus of claim 1, wherein said container body further comprises a metal or plastic drum.

3. The apparatus of claim 2, wherein said lid is removably secured to said container body via a bolt-type latch mechanism.

4. The apparatus of claim 1, wherein said funnel further comprises:
- an upper portion having an outer diameter slightly smaller than an inner diameter of said container body and affixed to said container body side wall with a plurality of fasteners; and,
- a tapering spout in fluid communication with said intermediate portion of said feed transfer assembly;
- wherein said amount of deer feed is delivered into said upper portion and gravity fed to said feed transfer assembly through said spout.

5. The apparatus of claim 1, wherein said blower further comprises a four-cycle gasoline-powered backpack-type leaf blower with a pull-start recoil device;
- wherein said blower provides an enabling thrust to transfer said feed through said feed transfer assembly and out of said dispensing pipe.

6. The apparatus of claim 1, wherein said feed transfer assembly further comprises:
- a first flexible hose, having a first end removably connected to said blower output;
- a first rigid pipe having a first end removably connected to a second end of said first hose and routed through an aligned pair of apertures through said transportation cart and said container body;
- a sanitary tee fitting having a first end removably connected to a second end of said first pipe, further having an inlet end in fluid communication with said funnel;
- a second rigid pipe having a first end removably connected to a second end of said sanitary tee fitting and routed through an aligned pair of apertures through said container body and said transportation cart;
- an elbow fitting, having a first end removably connected to a second end of said second pipe and a second end configured in an upward position;
- a second flexible hose having a first end removably connected to a second end of said second pipe; and,
- said dispensing pipe removably connected to a second end of said second hose, further comprising a downwardly-angled gooseneck;
- wherein said gooseneck is adapted to be stabilized onto said elevated feeder.

7. The apparatus of claim 6, wherein said first and said second hoses are each three inches in diameter.

8. The apparatus of claim 6, wherein said second hose is ten feet in length.

9. The apparatus of claim 6, wherein said feed transfer assembly further comprises a plurality of quick-disconnect fittings.

10. The feed transfer assembly of claim 1, wherein said transportation cart further comprises an ATV garden trailer unit enabling said apparatus to be towed by vehicle.

11. A deer feeder filling apparatus, comprising: a transportation cart; a feed container affixed to said transportation cart, further comprising a funnel; and, a feed transfer assembly, comprising a first portion adapted to be removably attached to and in fluid communication with an outlet of a blower, an intermediate portion removably attached to and in fluid communication with said funnel of said feed container, and a second portion comprising a dispensing pipe; wherein a desired amount of feed is dispensed into said funnel of said feed container; wherein said feed transfer assembly receives an amount of compressed air from said blower, draws in said feed through said funnel within said feed container, and dispenses said feed through said dispensing flange; and, wherein said apparatus is suited for transferring deer feed into an elevated feeder; wherein said feed container further comprises:
- a cylindrical container body;
- a lid removably secured about an upper perimeter edge thereof via a bolt-type latch mechanism;
- a plurality of fasteners affixing a bottom of said container body to a floor of said transportation cart; and,
- a pair of apertures along opposing locations of a side wall thereof, adjacent to said container bottom, and aligned with a pair of apertures of said transportation cart;
- wherein said feed transfer assembly is routed through said pair of apertures of said transportation cart and said pair of apertures of said container body, such that said intermediate portion is retained therein said container body; and,
- wherein said container body pair of apertures and said transportation cart apertures are aligned along a horizontal centerline.

12. The apparatus of claim 11, wherein said container body further comprises a metal or plastic drum.

13. The apparatus of claim 11, wherein said funnel further comprises:
- an upper portion having an outer diameter slightly smaller than an inner diameter of said container body and affixed to said container body side wall with a plurality of fasteners; and,
- a tapering spout in fluid communication with said intermediate portion of said feed transfer assembly;
- wherein said amount of deer feed is delivered into said upper portion and gravity fed to said feed transfer assembly through said spout.

14. The apparatus of claim 11, wherein said feed transfer assembly further comprises:
- a first flexible hose, having a first end removably connected to said blower output;
- a first rigid pipe having a first end removably connected to a second end of said first hose and routed through an aligned pair of apertures through said transportation cart and said container body;
- a sanitary tee fitting having a first end removably connected to a second end of said first pipe, further having an inlet end in fluid communication with said funnel;
- a second rigid pipe having a first end removably connected to a second end of said sanitary tee fitting and routed through an aligned pair of apertures through said container body and said transportation cart;

an elbow fitting, having a first end removably connected to a second end of said second pipe and a second end configured in an upward position;

a second flexible hose having a first end removably connected to a second end of said second pipe; and, said dispensing pipe removably connected to a second end of said second hose, further comprising a downwardly-angled gooseneck;

wherein said gooseneck is adapted to be stabilized onto said elevated feeder.

15. The apparatus of claim 14, wherein said first and said second hoses are each three inches in diameter.

16. The apparatus of claim 14, wherein said second hose is ten feet in length.

17. The apparatus of claim 14, wherein said feed transfer assembly further comprises a plurality of quick-disconnect fittings.

18. The apparatus of claim 14, wherein said transportation cart further comprises an ATV garden trailer unit enabling said apparatus to be towed by vehicle.

* * * * *